(12) United States Patent
Meier et al.

(10) Patent No.: US 10,180,905 B1
(45) Date of Patent: Jan. 15, 2019

(54) UNIFIED PREFETCH CIRCUIT FOR MULTI-LEVEL CACHES

(71) Applicant: Apple Inc., Cupertino, CA (US)

(72) Inventors: Stephan G. Meier, Los Altos, CA (US); Tyler J. Huberty, Sunnyvale, CA (US); Gerard R. Williams, III, Los Altos, CA (US); Pradeep Kanapathipillai, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 170 days.

(21) Appl. No.: 15/093,213

(22) Filed: Apr. 7, 2016

(51) Int. Cl.
*G06F 12/00* (2006.01)
*G06F 12/08* (2016.01)
*G06F 12/0862* (2016.01)
*G06F 12/0811* (2016.01)

(52) U.S. Cl.
CPC ...... *G06F 12/0862* (2013.01); *G06F 12/0811* (2013.01); *G06F 2212/283* (2013.01); *G06F 2212/6026* (2013.01)

(58) Field of Classification Search
CPC ...... G06F 12/00; G06F 12/08; G06F 12/0811; G06F 12/0862
See application file for complete search history.

(56) References Cited

U.S. PATENT DOCUMENTS

| | | | |
|---|---|---|---|
| 5,305,389 A | 4/1994 | Palmer | |
| 6,151,662 A | 11/2000 | Christie et al. | |
| 6,317,811 B1 | 11/2001 | Deshpande et al. | |
| 6,446,167 B1 | 9/2002 | Mayfield et al. | |
| 6,970,985 B2 | 11/2005 | Moritz | |
| 7,165,146 B2 | 1/2007 | Walin | |
| 7,493,607 B2 | 2/2009 | Moritz | |
| 7,836,259 B1 | 11/2010 | Filippo et al. | |

(Continued)

FOREIGN PATENT DOCUMENTS

| | | |
|---|---|---|
| EP | 0402787 | 12/1990 |
| TW | 486628 B | 5/2002 |

(Continued)

OTHER PUBLICATIONS

Office Action, U.S. Appl. No. 14/748,833, dated Sep. 13, 2017, 31 pages.

(Continued)

*Primary Examiner* — Tuan V Thai
(74) *Attorney, Agent, or Firm* — Meyertons, Hood, Kivlin, Kowert & Goetzel, P.C.; Lawrence J. Merkel

(57) ABSTRACT

In an embodiment, a processor may implement an access map-pattern match (AMPM)-based prefetch circuit for a multi-level cache system. The access patterns that are matched to the access maps may include prefetches for different cache levels. Centralizing the generation of prefetches into one prefetch circuit may provide better observability and controllability of prefetching at various levels of the cache hierarchy, in an embodiment. Prefetches at different levels may be controlled individually based on the accuracy of those prefetches, in an embodiment. Additionally, in an embodiment, access patterns that are longer that a given threshold may have the granularity of the prefetches change so that more data is prefetched and the prefetches occur farther in advance, in some embodiments.

16 Claims, 7 Drawing Sheets

(56) References Cited

U.S. PATENT DOCUMENTS

| | | | |
|---|---|---|---|
| 7,975,108 | B1 | 7/2011 | Holscher et al. |
| 8,255,631 | B2 | 8/2012 | Chen et al. |
| 8,627,009 | B2 | 1/2014 | Mekheil |
| 8,856,447 | B2 | 10/2014 | Williams, III |
| 8,892,822 | B2 | 11/2014 | Chou |
| 8,924,651 | B2 | 12/2014 | Tang et al. |
| 9,015,422 | B2 | 4/2015 | Meier et al. |
| 9,886,385 | B1 | 2/2018 | Huberty et al. |
| 9,904,624 | B1 | 2/2018 | Huberty et al. |
| 9,971,694 | B1 | 5/2018 | Meier et al. |
| 2002/0069326 | A1 | 6/2002 | Richardson et al. |
| 2002/0087802 | A1 | 7/2002 | Al-Danjani |
| 2003/0079089 | A1 | 4/2003 | Barrick et al. |
| 2007/0088915 | A1* | 4/2007 | Archambault ........ G06F 8/4442 711/137 |
| 2007/0088918 | A1 | 4/2007 | Shen |
| 2007/0288697 | A1 | 12/2007 | Keltcher |
| 2008/0016330 | A1 | 1/2008 | El-Essawy et al. |
| 2008/0155196 | A1 | 6/2008 | Black |
| 2009/0199190 | A1 | 8/2009 | Chen et al. |
| 2009/0217004 | A1 | 8/2009 | Van De Waerdt |
| 2009/0307691 | A1 | 12/2009 | Moscibroda et al. |
| 2010/0268892 | A1 | 10/2010 | Luttrell |
| 2011/0066811 | A1 | 3/2011 | Sander et al. |
| 2012/0159073 | A1 | 6/2012 | Jaleel et al. |
| 2013/0238861 | A1 | 9/2013 | Manne et al. |
| 2013/0254485 | A1 | 9/2013 | Kannan et al. |
| 2013/0346703 | A1 | 12/2013 | McCauley et al. |
| 2014/0108740 | A1 | 4/2014 | Rafacz et al. |
| 2014/0258641 | A1* | 9/2014 | Hooker ............... G06F 12/0862 711/137 |
| 2016/0062768 | A1 | 3/2016 | Jagannathan et al. |

FOREIGN PATENT DOCUMENTS

| | | |
|---|---|---|
| TW | 200821925 A | 5/2008 |
| TW | 200901027 A | 1/2009 |

OTHER PUBLICATIONS

Office Action, U.S. Appl. No. 15/093,173, dated Aug. 11, 2017, 18 pages.
Yasuo Ishii, et al., "Access Map Pattern Matching Prefetch: Optimization Friendly Method",University of Tokyo, 2009, pp. 1-5.
Yasuo Ishii, et al., "Access Map Pattern Matching for High Performance Data Cache Prefetch", Tokyo, Japan, published Jan. 2001, pp. 1-24.
International Search Report and Written Opinion from PCT/US2014/042633, dated Oct. 9, 2014, Apple Inc., pp. 1-9.
Notice of Preliminary Rejection in Korean Patent Application No. 10-2013-29235, dated May 16, 2014, 6 pages.
International Search Report and Written Opinion in Application No. PCT/US2013/030497, dated May 7, 2013, pp. 1-13.
Zhigang Hu, Margaret Martonosi, and Stefanos Kaxiras "TCP: Tag Correlating Prefetchers", Feb. 2003, Proceedings of the 9th International Symposium on High-Performance Computer Architecture (HPCA '03), pp. 1-10.
Fei Gao, Hanyu Cui, Suleyman Sair "Two-level Data Prefetching" 25th International Conference on Computer Design, 2007, pp. 1-8.
Harold W. Cain, Priya Nagpurkar, "Runahead Execution vs. Conventional Data Prefetching in the IBM POWER6 Microprocessor" International symposium on performance analysis of systems and software, 2010, pp. 1-10.
European Extended Search Report in application No. 13159754.4-1953 dated Jul. 26, 2013 pp. 1-7.
Notice of Last Preliminary Rejection in Korean Patent Application No. 10-2013-29235, dated Oct. 30, 2014, 4 pages.
Office Action in Taiwan Patent Application No. 102109728, dated Oct. 14, 2014, 15 pages.
U.S. Appl. No. 14/748,833, filed Jun. 24, 2015, Meier et al.
U.S. Appl. No. 15/093,173, filed Apr. 7, 2016, Huberty et al.
Jia et al, "An Improved AMPM-based Prefetcher Coupled with Configurable Cache Line Sizing," 2015, accessed (in Jul. 2018) from http://comparch-conf.gatech.edu/dpc2/resource/dpc2jia.pdf, 4 pages.
Mansi, "An Improved Hybrid AMPM and ISB Prefetcher," 2016, place of publication unknown, pp. 1-8.
Dimitrov et al, "Combining Local and Global History for High Performance Data Prefetching," Journal of Instruction-Level Parallelism 13 (2011), pp. 1-14.
Nesbit et al, "Data Cache Prefetching Using a Global History Buffer," published in 10th International Symposium on High Performance Computer Architecture (HPCA '04), Feb. 14-18, 2004, 10 pages.
U.S. Appl. No. 15/435,910, Stephan G. Meier, filed Feb. 17, 2017.

* cited by examiner

```
                          AP
              A  A │ A │ P  P            Unit Stride, Forward
        A  .  A  . │ A │ .  P  .  P      Non-unit, Regular Stride, Forward
48 ─────      P  P │ A │ A  A            Unit Stride, Backward
        A  *  *  * │ A │ P               Wildcards
A  A  .  .  A  . │ A │ P  P  .  P  P     Irregular Pattern, Forward
A  .  A  A  A  . │ A │ .  P  P           Irregular Pattern, Forward
      A  A  A  A  A │ A │ P  P  P  L  L  Unit Stride with Next Level
                    │ A │ L  L  L  L  L  Density Pattern
```

Fig. 3

```
                AP
     A  .  .  * │ A │ P     Wildcard Pattern
     A  .  .  A │ A │       Matching Access Map 1
     A  .  .  S │ A │       Matching Access Map 2
     A  .  .  P │ A │       Matching Access Map 3
     A  .  .  . │ A │       Matching Access Map 4
```

Fig. 4

| State | AQF | BQF |
|---|---|---|
| Initial Map Allocation | + | 0 |
| Data Cache Load Prefetch | - | 0 |
| Data Cache Store Prefetch | - | 0 |
| Data Cache Prefetch Consumed by Demand | + | 0 |
| Pending Prefetch Consumed by Demand | + | 0 |
| Prefetch Hit in Data Cache | - | 0 |
| Prefetch Initial Miss in External Cache | 0 | + |
| Prefetch Subsequent Miss in External Cache | 0 | + |
| External Cache Load Prefetch | - | - |
| External Cache Store Prefetch | - | - |
| External Cache Prefetch Consumed by Demand | + | 0 |
| External Cache Prefetch Consumed by Data Cache Prefetch | + | 0 |
| External Cache Pending Prefetch Consumed by Demand | + | 0 |

Fig. 8

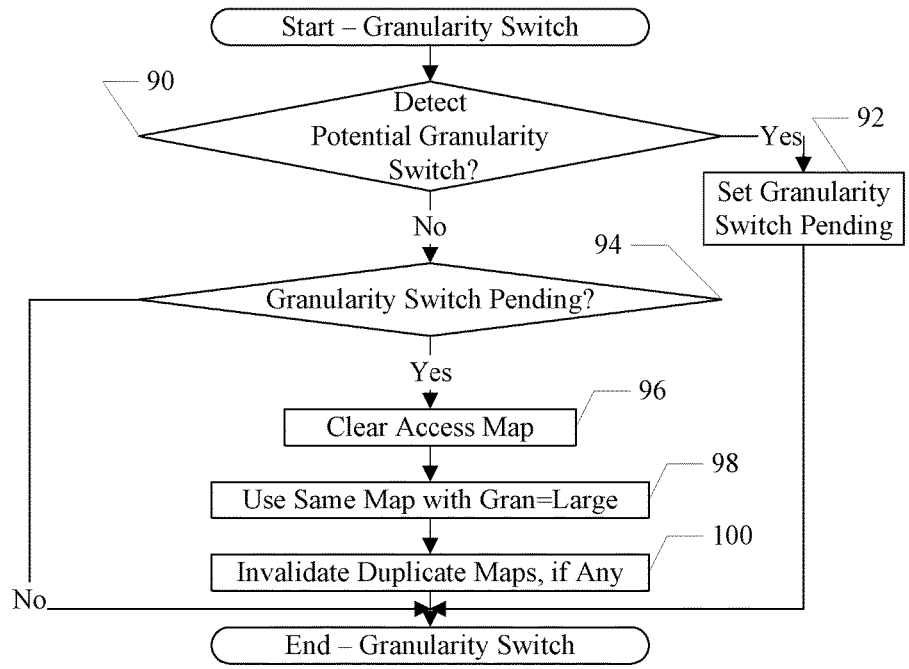

Fig. 9

UNIFIED PREFETCH CIRCUIT FOR MULTI-LEVEL CACHES

BACKGROUND

Technical Field

This invention is related to prefetch mechanisms in processors.

Description of the Related Art

Processors continue to be produced with both higher operating frequencies and higher average number of instructions executed per clock cycle (IPC). Memory latency, on the other hand, has decreased at a much slower rate. As a result, processors are often stalled awaiting instructions and/or data from memory. In order to improve performance, processors typically include one or more levels of caching. Data stored in the cache may be available at a much lower latency than data from memory. Thus, cache hits may be provided with low latency and may improve performance of the processors. Cache misses are fetched from memory and incur the higher memory latencies.

In an attempt to reduce the effective memory latency even further, processors can implement prefetching. Generally, prefetching involves predicting which cache blocks the processor will need to access soon, and initiating the memory read for the cache blocks prior to such accesses being generated via instruction code execution in the processor. If the prefetching successfully reads cache blocks that are later accessed by the processor, memory latency is reduced because the accesses are cache hits instead of cache misses. On the other hand, inaccurate prefetching can cause useful data to be removed from the cache and the inaccurately prefetched data is not accessed, which reduces performance. Additionally, even if performance is not adversely affected or improved by a small amount, excess power consumed by the processor to perform the prefetching might not be justified. Particularly, in portable devices in which the available energy is limited (e.g. from a battery), the excess power consumption can reduce battery life.

Additionally, for multiple levels of caching in a hierarchy between the processors and memory, a further complication of prefetching is determine the cache into which the data is prefetched. Data that will be used rapidly might be prefetched into one of the higher level caches close to the processor, while data that might be accessed later in time might be prefetched into lower level caches. Since caches tend to increase in size at lower levels, prefetching into a lower level cache can be less likely to cause eviction of useful data.

SUMMARY

In an embodiment, a processor may implement an access map-pattern match (AMPM)-based prefetch circuit with features designed to improve prefetching accuracy and/or reduce power consumption in a multi-level cache system. In an embodiment, the access patterns that are matched to the access maps may include prefetches for different cache levels. By studying various access patterns exhibit by various workloads, the levels of cache that should receive prefetches may be selected. The access patterns to generate prefetches to the selected levels may be programmed into the prefetcher. Centralizing the generation of prefetches into one prefetch circuit may provide better observability and controllability of prefetching at various levels of the cache hierarchy, in an embodiment. Prefetches at different levels may be controlled individually based on the accuracy of those prefetches, in an embodiment. Additionally, in an embodiment, access patterns that are longer that a given threshold may have the granularity of the prefetches change so that more data is prefetched and the prefetches occur farther in advance, in some embodiments.

BRIEF DESCRIPTION OF THE DRAWINGS

The following detailed description makes reference to the accompanying drawings, which are now briefly described.

FIG. 3 is a diagram illustrating exemplary patterns to be matched.

FIG. 4 is a diagram illustrating a pattern including a wild card and the matching patterns.

FIG. 8 is a table illustrating one embodiment of quality factor updates.

FIG. 9 is a flowchart illustrating operation of one embodiment of the prefetch circuit shown in FIG. 2 for changing a granularity of the prefetch.

Figure 1:
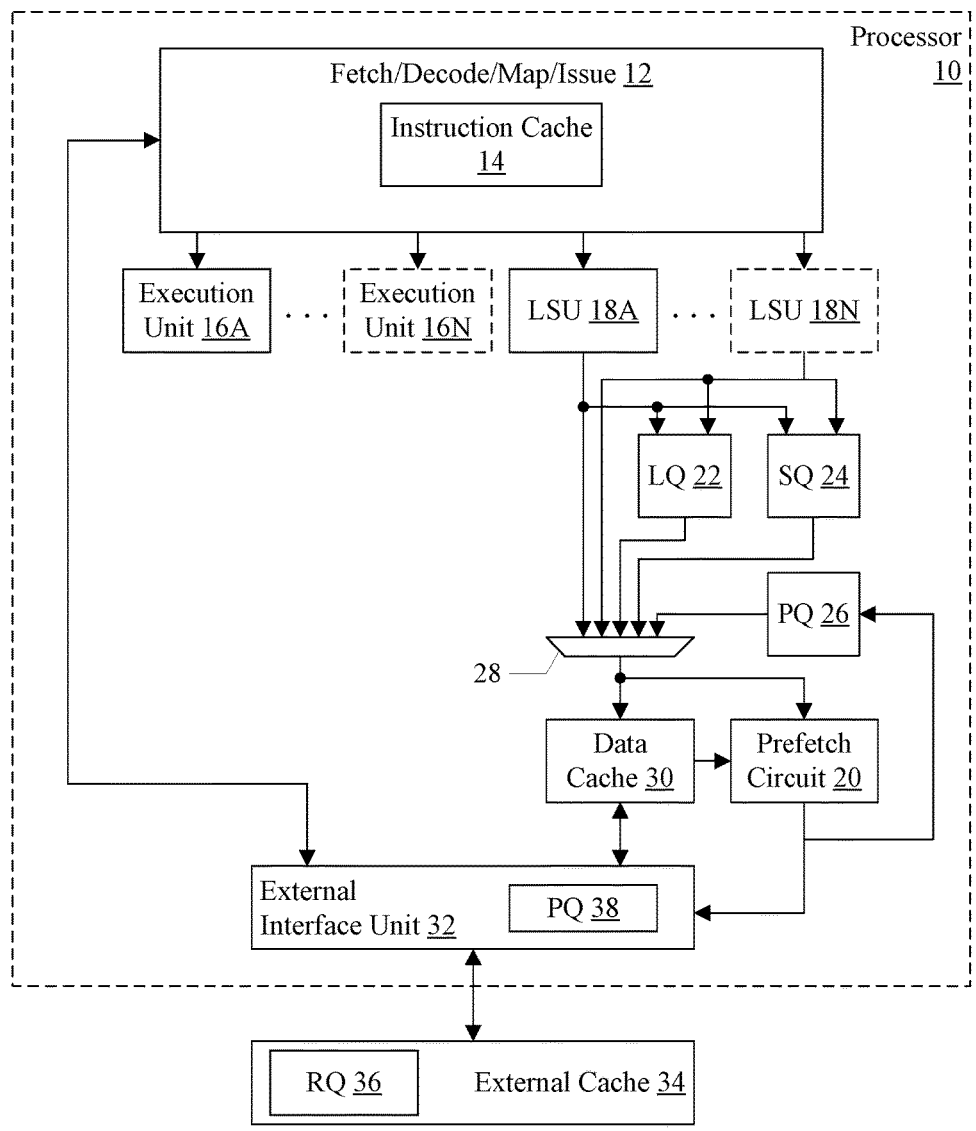
FIG. 1 is a block diagram of one embodiment of a portion of a system including a processor and an external cache.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

Processor Overview

Turning now to FIG. 1, a block diagram of one embodiment of a portion of a system including a processor 10 and an external (to the processor 10) cache 34 is shown. In the embodiment of FIG. 1, the processor 10 may include a fetch/decode/map/issue (FDMI) unit 12 that may include an instruction cache 14. The processor 10 may further include one or more execution units 16A-16N, one or more load/store units (LSUs) 18A-18N, a prefetch circuit 20, a load queue (LQ) 22, a store queue (SQ) 24, a prefetch queue (PQ) 26, a multiplexor (mux) 28, a data cache 30, and an external interface unit 32. The external interface unit 32 may also include a prefetch queue 38. The data cache 30 and the FDMI unit 12 are coupled to the external interface unit 32, which is coupled to communicate external to the processor 10 (e.g. to the external cache 34 and/or to other components of a system including the processor 10). The FDMI unit 12 is coupled to the execution units 16A-16N and the LSUs 18A-18N. The LSUs 18A-18N are coupled to the load queue 22 and the store queue 24, and the prefetch circuit 20 is coupled to the data cache 30 and the prefetch queue 26. The LSUs 18A-18N, the load queue 22, the store queue 24, and the prefetch queue 26 are coupled to the mux 28, which is coupled to the data cache 30 and the prefetch circuit 20.

The FDMI unit 12 may be configured to fetch instructions for execution by the processor 10, decode the instructions into ops for execution, map the ops to speculative resources (e.g. rename registers) to permit out-of-order and/or speculative execution, and issue the ops for execution to the execution units 16A-16N and/or LSUs 18A-18N. More particularly, the FDMI unit 12 may be configured to cache instructions previously fetched from memory (through the external interface unit 32) in the instruction cache 14, and may be configured to fetch a speculative path of instructions for the processor 10. The FDMI unit 12 may implement various prediction structures to predict the fetch path. For example, a next fetch predictor may be used to predict fetch addresses based on previously executed instructions. Branch predictors of various types may be used to verify the next fetch prediction, or may be used to predict next fetch addresses if the next fetch predictor is not used. The FDMI unit 12 may be configured to decode the instructions into instruction operations. In some embodiments, a given instruction may be decoded into one or more instruction operations, depending on the complexity of the instruction. Particularly complex instructions may be microcoded, in some embodiments. In such embodiments, the microcode routine for the instruction may be coded in instruction operations. In other embodiments, each instruction in the instruction set architecture implemented by the processor 10 may be decoded into a single instruction operation, and thus the instruction operation may be essentially synonymous with instruction (although it may be modified in form by the decoder). The term "instruction operation" may be more briefly referred to herein as "op." The ops may be mapped to physical registers from the architectural registers used in the instructions, and then scheduled for issue. The scheduling may be centralized in a scheduler, or decentralized in reservation stations, in various embodiments, based on the availability of operands for each op. A register file or files (not shown in FIG. 1) may implement the physical registers of the processor 10. There may be separate physical registers for different operand types (e.g. integer, media, floating point, etc.) in an embodiment. In other embodiments, the physical registers may be shared over operand types.

The execution units 16A-16N may include any types of execution units in various embodiments. For example the execution units 16A-16N may include integer, floating point, and/or media execution units. Integer execution units may be configured to execute integer ops. Generally, an integer op is an op which performs a defined operation (e.g. arithmetic, logical, shift/rotate, etc.) on integer operands. Integers may be numeric values in which each value corresponds to a mathematical integer. The integer execution units may include branch processing hardware to process branch ops, or there may be separate branch execution units.

Floating point execution units may be configured to execute floating point ops. Generally, floating point ops may be ops that have been defined to operate on floating point operands. A floating point operand is an operand that is represented as a base raised to an exponent power and multiplied by a mantissa (or significand). The exponent, the sign of the operand, and the mantissa/significand may be represented explicitly in the operand and the base may be implicit (e.g. base 2, in an embodiment).

Media execution units may be configured to execute media ops. Media ops may be ops that have been defined to process media data (e.g. image data such as pixels, audio data, etc.). Media processing may be characterized by performing the same processing on significant amounts of data, where each datum is a relatively small value (e.g. 8 bits, or 16 bits, compared to 32 bits to 64 bits for an integer). Thus, media ops often include single instruction-multiple data (SIMD) or vector operations on an operand that represents multiple media data.

Thus, each execution unit may comprise hardware configured to perform the operations defined for the ops that the particular execution unit is defined to handle. The execution units may generally be independent of each other, in the sense that each execution unit may be configured to operate on an op that was issued to that execution unit without dependence on other execution units. Viewed in another way, each execution unit may be an independent pipe for executing ops.

The LSUs 18A-18N may be configured to execute load/store memory ops. Generically, a memory operation (memory op) may be an instruction operation that specifies an access to memory (although the memory access may be completed in a cache such as the data cache 30 or the external cache 34). Generally, a load memory operation may specify a transfer of data from a memory location to a register, while a store memory operation may specify a transfer of data from a register to a memory location. Load memory operations may be referred to as load memory ops, load ops, or loads; and store memory operations may be referred to as store memory ops, store ops, or stores. The LSUs 18A-18N may be configured to perform virtual address generation from various address operands of the load/store ops and may be configured to transmit the ops to the data cache 30 (through the mux 28) and to the load queue 22/store queue 24.

The load queue 22 may be configured to queue load ops that have been executed by the LSUs 18A-18N. The load ops may be queued awaiting cache fills if they miss in the data cache 30 (and/or TLB miss translation fills if translation is enabled). The load ops may be queued for ordering reasons as well. Similarly, the store queue 24 may be configured to queue store ops that have been executed by the LSUs 18A-18N. The store ops may be queue for cache/TLB fills, to await store data from the data source operand, and/or to await non-speculative/retired state to update the data cache 30 and/or memory. In other embodiments, a combined load/store queue may be used.

The prefetch queue 26 may store prefetch requests generated by the prefetch circuit 20 to access the data cache 30. The prefetch requests may be generated by the prefetch circuit 20 observing the load/store ops executed by the LSUs 18A-18N. Thus, the prefetch requests may be predicted read requests generated prior to the instruction code being executed by the processor 10 actually requesting the data. Viewed in another way, a prefetch request may be generated as a prediction that one or more subsequently-executed ops will access the prefetched data. In contrast, cache requests by load/store ops may be referred to as demand fetches, because they are directly specified by the execution of code, rather than predicted. The prefetch requests are thus speculative, and may later be found to be incorrect if the demand fetches do not subsequently access the prefetched data.

In an embodiment, the prefetch circuit 20 may be an implementation of an AMPM prefetcher with various enhancements. The AMPM prefetcher is described in more detail below. The prefetch circuit 20 may monitor the demand fetches/prefetch requests selected through the mux 28 to access the data cache 30, along with cache hit/miss status from the data cache 30, to generate prefetch requests.

The data cache 30 may have any capacity and configuration. For example, set associative, fully associative, and direct mapped configurations may be used in various embodiments. The data cache 30 may be configured to cache data in cache blocks, where a cache block is a set of bytes from contiguous memory locations that are allocated and deallocated space in the cache as a unit. The cache blocks may be aligned to a cache block boundary (e.g. a 32 byte cache block may be aligned to a 32 byte boundary, a 64 byte cache block may be aligned to a 64 byte boundary, a 128 byte cache block may be aligned to a 128 byte boundary, etc.). Thus, the address of a byte may be divided into a cache offset portion (the least N significant bits of the address, where $2^N$ is the size of the cache block) and a cache tag portion (the remaining address bits). In an embodiment, the data cache 30 may be virtually indexed and a translation lookaside buffer (TLB, not shown in FIG. 1) may be accessed in parallel to translate the virtual address to a physical address of a memory location in the memory.

Cache misses in data cache 30 and instruction cache 14, as well as translation accesses, non-cacheable accesses, etc. may be communicated to the external interface unit 32. The external interface unit 32 may be configured to transmit transactions to the external cache 34 in response to the various accesses generated in the processor 10. The external interface on which transactions are transmitted may have any form. For example, the external interface may be a shared bus, a point to point interconnect with packetized transactions, a full or partial crossbar, etc.

The external cache 34 may have any capacity and configuration as well. In an embodiment, the external cache 34 may be a level 2 (L2) cache. In another embodiment, the processor 10 may include an L2 cache and the external cache 34 may be a level 3 (L3) cache. The external cache 34 may be any level of cache in a memory hierarchy. The external cache 34 may be inclusive of the data cache 30, non-inclusive of the data cache 30, or exclusive of the data cache 30, in various embodiments. The cache block size in the external cache 34 may be the same size as the cache block size of the data cache 30, or may be a different cache block size (e.g. a larger cache block size).

The request queue 36 may be configured to receive requests from the processor 10 (and potentially other processors in a multiprocessor configuration) to access the external cache 34. The requests may be demand fetches, or may be prefetch requests. The prefetch requests from the prefetch circuit 20 that are targeted at the external cache 34 (as opposed to those that target the data cache 30 and miss) may bypass the data cache 30 and may be enqueued by the prefetch circuit 20 in the prefetch queue 38 for transmission to the external cache 34. Prefetch requests that miss in the data cache 30, as well as demand fetch misses in the data cache 30 and/or the instruction cache 14, may be transmitted as requests by the external interface unit 32 to the external cache 32 as well. Each of these requests may be queued in the request queue 36; and the requests may be serviced by the external cache 34 from the request queue 36. If the requests are a miss in the external cache 34, the requests may be transmitted to lower level caches and/or a main memory in a system including the processor 10.

The mux 28 may select among its various inputs (the LSUs 18A-18N, the load queue 22, the store queue 24, and the prefetch queue 26) to transmit cache accesses to the data cache 30. Control logic to the mux 28 (not shown in FIG. 1) may arbitrate among the requests using any desired arbitration scheme. The mux 28 may select multiple inputs to access the data cache 30 (and the prefetch circuit 20) concurrently (e.g. up to one per data cache port). In an embodiment, the data cache 30 may include two read ports and two write ports, for example, supporting up to two load ops (and/or store ops performing a hit check) and two store ops per clock cycle. More or fewer ports may be supported.

It is noted that any number and type of execution units 16A-16N may be included in various embodiments, including embodiments having one execution unit and embodiments having multiple execution units. Any number of LSUs 18A-18N may be included in various embodiments as well, including one LSU and multiple LSUs. Additionally embodiments that include load units (that execute only load ops) and/or store units (that execute only store ops) may be included with or without LSUs.

Prefetch Circuit

Figure 2:
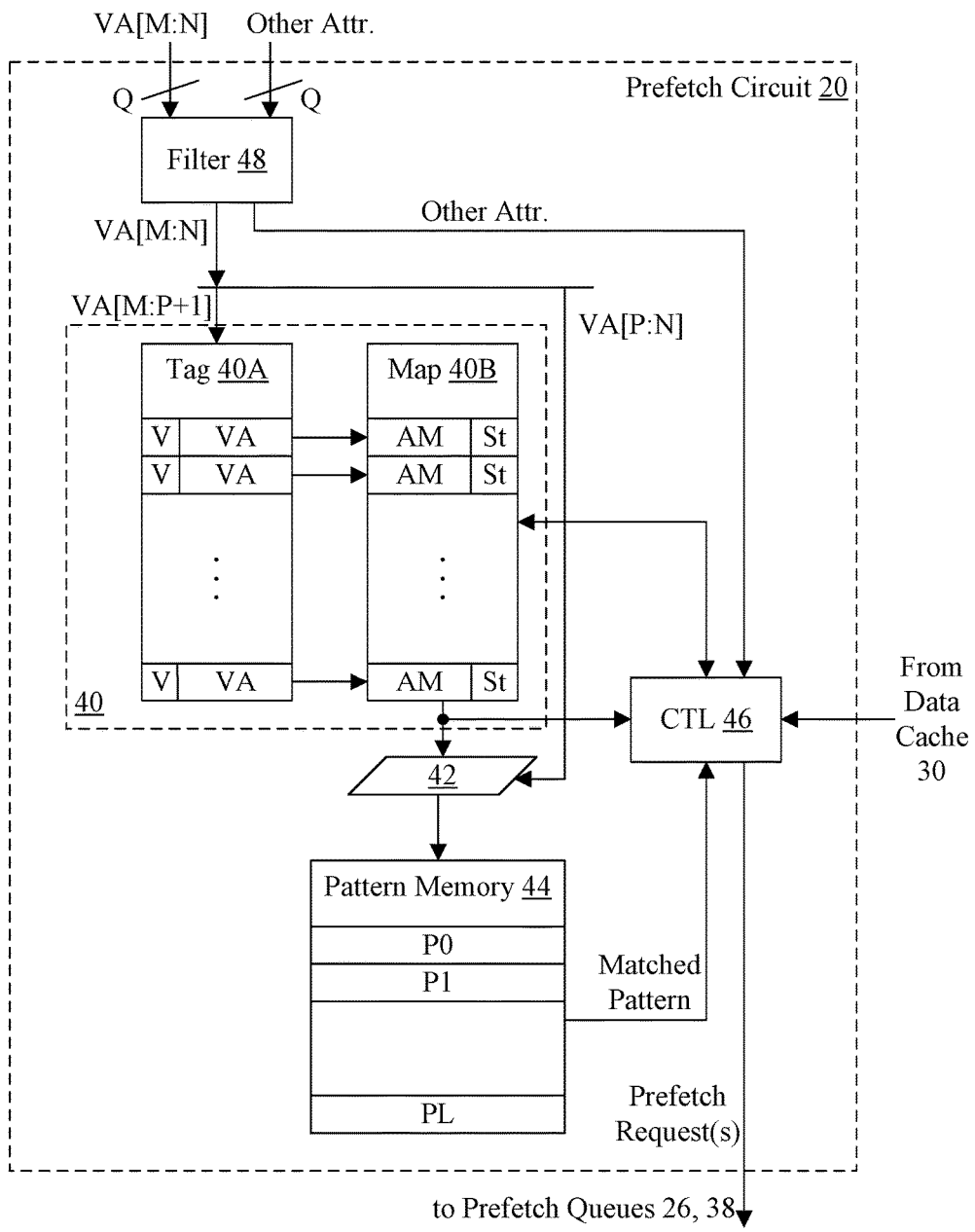
FIG. 2 is a block diagram of one embodiment of a prefetch circuit shown in FIG. 1.

Turning now to FIG. 2, a block diagram of one embodiment of the prefetch circuit 20 is shown. In the illustrated embodiment, the prefetch circuit 20 includes an access map memory 40, a shifter 42, an access pattern memory 44, a control circuit 46, and an input filter buffer 48.

The filter buffer 48 may receive Q concurrent memory operations from the LSUs 18A-18N, through the mux 28. Q may be an integer greater than 1 (e.g. 4, in the above example in which the data cache has 4 ports). The filter buffer 48 may capture information from the operations for presentation to the access map memory 40 and the control circuit 46. The filter buffer 48 may be configured to merge multiple memory operations to the same access map and present the operations to the access map memory 40, the shifter 42, and the control circuit 46. In the illustrated embodiment, the filter buffer 48 may be configured to present one operation per clock cycle, although other embodiments may be configured to present more operations in parallel, but less than Q operations. The size and complexity of the memory structures and circuitry in the prefetch circuit 20 to support concurrent operations may be reduced through use of the filter buffer 48.

The filter buffer 48 may capture the virtual address (or a portion thereof) from each memory operation as well as various other attributes that may be used by the prefetch circuit 20. For example, the prefetch circuit 20 may receive a physical address to which the virtual address translates. The physical address may actually be received later in time than the virtual address, and may be updated into the access map memory 40. The physical address may be used for prefetches to lower level caches such as the external cache 34, which may be physically addressed. The data cache 30 may be virtually addressed, in some embodiments.

The access map memory 40 and the shifter 42 are coupled to receive the virtual address of an access launched from the filter buffer 48 (or portions of the virtual address, as shown in FIG. 2), and the output of the access map memory 40 is coupled to the shifter 42. The control circuit 46 is coupled to the access map memory 40 and to the access pattern memory 46. The control circuit 46 may be configured to provide prefetch requests to the prefetch queues 26 and 38, and may be configured to receive cache hit/miss information from the data cache 30. The shifter 42 is coupled to the access pattern memory 44. In the illustrated embodiment, the access map memory 40 includes a tag memory 40A and a map memory 40B.

The prefetch circuit 20 may be an implementation of an AMPM prefetcher. The access map memory 40 may store multiple access maps covering various access regions in the virtual address space. The access maps may represent the accesses to the cache blocks in the respective access regions. When another access hits on an access map in the access map memory 40, the access map may be output and compared to various access patterns stored in the access pattern memory 44. If a match between a given access pattern and the access map is detected, prefetch requests indicated by the matching pattern may be generated. The access patterns may be determined from trace analysis performed on various code sequences expected to be executed by the processor 10 during use. Given a certain pattern of demand accesses and/or successful prefetches, for example, one or more prefetches may be predicted based on the trace analysis. The access patterns may be identified during design of the processor 10 and hardcoded into the access pattern memory 44. Alternatively, some or all of the access patterns may be programmable in the access pattern memory 44 and may be written to the access pattern memory 44 during initialization of the processor 10 (e.g. at reset) or at some other convenient time.

As mentioned above, the access map 40 may store multiple access maps covering various access regions in the virtual address space. The access region may be a region of the virtual address space that includes multiple contiguous cache blocks. The access region may be aligned to a boundary determined by the size of the access region. For example, if access regions cover 2 kilobytes (kB) each, then the access regions are aligned to 2 kB boundaries. The access regions may be any desired size. For example, 4 kB access regions may be defined. Generally, an access map may be a record of various cache accesses that have occurred to the cache blocks within the access region. Each cache block within the access region may have an associated symbol in the access map, indicating the type of access that has occurred. In one embodiment, accesses may include demand-accessed (symbol A), prefetched to data cache 30 (symbol P), prefetched to lower level cache (L), successful prefetch (symbol S), or invalid (symbol "."). Each symbol may be represented by a different code of a value stored for the cache block in the access map. Thus, three bits per cache block may be stored based on the above symbols.

In an embodiment, access maps may have more than one granularity for the symbols in the map. One granularity may be the cache block sized granularity mentioned above. A second granularity may be a multiple cache-block-sized granularity. That is, each symbol at the second granularity may represent multiple adjacent cache blocks. Prefetch requests generated at the second granularity may prefetch the multiple adjacent cache blocks, in an embodiment. By changing granularity, more data may be prefetched more rapidly than at the original granularity. Granularity may be changed, e.g., when an access map reaches a certain length (i.e. number of demand accesses). Such an access map may indicate a high amount of regularity and locality in the region, and thus additional prefetching may be desirable.

A demand-accessed cache block may be a cache block that was accessed without having been prefetched in advance. Thus, a load or store to the cache block may have been executed, and may have missed in the data cache 30. A prefetched (P) cache block may be a cache block that was predicted to be accessed by the prefetch circuit 20, which generated a prefetch request that passed through the prefetch queue 26 and was presented to the data cache 30. Alternatively, the prefetched cache block may have had a prefetch request generated and inserted into the prefetch queue 26, but may or may not have been presented to the data cache 30. A prefetched (L) cache block may be a cache block that was predicted to be accessed by the prefetch circuit 20, which generated a prefetch request to the lower level cache (e.g. external cache 34). The prefetch request for an L symbol may be transmitted to the lower level cache without passing through data cache 30, in an embodiment. In other embodiments, data cache 30 may be checked for a hit for a prefetch request for an L symbol. In either case, the data prefetched from the memory system or a level of cache lower than the external cache 34 may be written to the external cache 34 rather than the data cache 30. A subsequent miss or prefetch to the data cache 30 may result in a hit in the external cache 34. A successfully prefetched cache block may be a cache block that was prefetched (either to the data cache 30 or the external cache 34), and was subsequently demand-accessed (and thus the demand access was a cache hit in the data cache 30 and/or the external cache 34). A successfully prefetched cache block may thus be an accurately prefetched cache block, since it was accessed. An invalid cache block in the access map may be a cache block that has not been accessed.

In an embodiment, there may be "prefetch in progress" symbols for each of the P and L symbols as well, indicating that a prefetch request has been generated but is not yet completed. It is noted that, while different prefetch symbols are provided in the access maps (and pattern maps), other embodiments may support prefetch requests to more than two levels of cache. An additional prefetch symbol may be added for each cache level.

Accordingly, the virtual address (VA) of the data cache access (not including the N least significant bits of the address, bits N−1:0, where $2^N$ is the size of a cache block) may be input to the prefetch circuit 20. The least significant P-N bits of the virtual address provided to the prefetch circuit 20 may be an offset within the access map to the cache block being accessed. Thus, the access maps may cover $2^{P+1}$ bytes. The remainder of the virtual address, bits M:P+1, may be a tag that may be compared to the tags in the tag memory 40A.

The tag memory 40A may include multiple entries, each entry storing a tag for a corresponding access map in the map memory 40B. In an embodiment, the access map memory 40 may be fully associative and thus the tag memory 40A may be content addressable memory (CAM). If a match is detected between the VA tag input to the access map memory 40 and an entry in the CAM 40A (and the valid bit is set), a hit is detected on the entry. A corresponding entry in the map memory 40B (e.g. a random access memory, or RAM) may be output by the access map memory 40 to the shifter 42. Each entry in the map RAM 40B may include the access map (symbols for each cache block in the access region, labeled AM in FIG. 2) and may optionally include state associated with the access map (labeled St in FIG. 2). Exemplary state for various embodiments will be described in more detail below.

The access patterns in the access pattern memory 44 may be centered on an access point, which may be in approximately the center of the access pattern. That is, the access point may be one position to the right or the left of the exact middle of the access pattern, since the access pattern may be an even number of symbols long and the exact middle is between the two symbols. If the access pattern is an odd number of symbols, the access point may be the center of the pattern. By placing the access point in the center, the patterns may permit both forward and reverse patterns of accesses to be detected. A forward pattern may be progressing at increasingly larger offsets within the access map (viewing the access map offset as a number), whereas a reverse pattern may be progressing at decreasingly smaller offsets. Furthermore, matches to symbols on both sides of the access point may be permitted to capture unusual access patterns.

Accordingly, based on the access map offset of the input VA, the shifter 42 may shift the access map to align the current access point of the access map to the access point in the pattern memory 44. The shifted access pattern may be provided to the access pattern memory 44, which may compare the shifted access pattern to the patterns. The access pattern memory 44 may thus be a read-only memory (ROM) with comparison circuitry, a CAM, or a combination of ROM and CAM if some access patterns are hardcoded and others are programmable. If a pattern is matched, the matched pattern may be output by the access pattern memory 44 to the control circuit 46. The control circuit 46 may be configured to generate one or more prefetch requests based on the matched pattern and may transmit the prefetch requests to the prefetch queue 26. In the illustrated embodiment, the access pattern memory 44 may include L+1 entries, storing L+1 access patterns labeled P0 to PL in FIG. 2. In an embodiment, the generated prefetch requests may include a pointer indication indicating whether or not pointer read activity in the access map has been observed and should be included in determining prefetches. In an embodiment, the access map and/or the matched pattern may be provided with the prefetch request as well, for the prefetch circuit 36.

A given access map may match more than one pattern in the pattern memory 44. Longer patterns (patterns having the most demand-accessed and/or successfully prefetched cache blocks) may be more likely to generate accurate prefetches. In an embodiment, the patterns in the pattern memory 44 may be sorted so that the longer patterns are nearest one end of the memory (e.g. the "top", where pattern P0 is stored, or the "bottom", where pattern PL is stored). The pattern memory 44 may include a priority encoder that selects the match nearest the top, or nearest the bottom, if there is more than one match. In this manner, the longest pattern that is matched may be naturally selected from the pattern memory 44 and provided to the control circuit 46. Other embodiments may not necessarily order the patterns as discussed in this paragraph, but may still output the longest pattern that is matched by the access map.

In addition to generating the prefetch requests, the control circuit 46 may be configured to update the hitting access map in the access map memory 40. The update may, in some cases, be affected by the cache hit/miss result and thus the cache hit/miss from the data cache 30 may be received by the control circuit 46. In the event of a miss on the access map memory 40, the prefetch circuit 20 may allocate an access map entry to the virtual address and may begin tracking the access map in the allocated entry.

FIG. 3 illustrates various examples of access patterns that may be represented in the access pattern memory 44 according to one embodiment of the prefetch circuit 20. The access point (AP) is illustrated with a heading of AP and two vertical lines separating the symbol at the access point from the other symbols. The access patterns may use the same set of symbols that are used in access maps, including the ".", P, L, A, and S symbols (although no S symbols are used in the examples of FIG. 3).

The first pattern shown is a simple unit stride pattern as may be detected by a stride based prefetcher. In this case, the pattern is forward and thus the A symbols are on the left and the P symbols are on the right. To match this pattern, the three A symbols would need to be matched to the access map. If a match on this pattern is detected, the control circuit 46 may be configured to generate two prefetch requests, one at the access point plus one cache line and one at the access point plus two cache lines. If the access map already included one P, the other prefetch request may be generated. If both Ps were already in the access map, no additional prefetch requests may be generated.

The second pattern shown is a non-unit stride, but still a regular stride, in the forward direction. In this example, the stride is two. If a match on this pattern is detected (by matching the three As and the intervening "." symbols as well), the control circuit 46 may be configured to generate two prefetch requests, one at the access point plus two cache lines and one at the access point plus four cache lines. Like the first pattern, if a given P is already in the access map, the other prefetch request may be generated and no prefetch requests may be generated if both Ps are already in the access map.

The third pattern show is a unit stride pattern in the backward direction, again two prefetches would be generated if the pattern is matched by the three As, two prefetch requests would be generated (one at the access point minus one cache line, the other at the access point minus two cache lines). Like the first pattern, if a given P is already in the access map, the other prefetch request may be generated and no prefetch requests may be generated if both Ps are already in the access map.

The first three patterns in FIG. 3 illustrate patterns that a stride-based prefetcher may be able to detect. However, the control over the number of prefetches that are generated may be more precise using the patterns. In an embodiment, if there are N matching As and/or Ss in a pattern, there may be N−1 Ps in the pattern. Thus, as the pattern length is longer, the confidence in the pattern to generate accurate prefetches may increase.

In addition, a wildcard symbol may be included in the patterns. For example, the fourth pattern shown may include three wildcard symbols, illustrated as "*" in FIG. 3 (e.g. at reference number 48). The wildcard pattern may match any symbol in an access map. The wildcard patterns may increase the flexibility of the access patterns, in an embodiment. For example, in an out-of-order processor, the demand accesses may occur in a variety of orders based on operand availability, execution resource availability, and other dynamic factors. The varying order of accesses creates "noise" near the access point. Without wildcards, accurately matching such access maps to access patterns may be more complicated. Multiple access patterns might have to be included, to capture all the possible orders, for example, limiting the number of unrelated access patterns that may be included in a given size of memory.

Another case in which wildcard symbols in access patterns may be useful is to capture access maps in which unusual orders of accesses are performed by the code (even if executed approximately in order), even though the final access patterns may be regular (e.g. all the cache blocks in a range of the access map may be touched, or a predictable group may be touched). Wildcard symbols may be used for the unusual ordered accesses in such cases.

As mentioned, a wildcard symbol may match any symbol at the same point in an access map. Accordingly, multiple access maps may match a pattern that includes a wildcard symbol. FIG. 4 is an example of an access pattern with one wildcard symbol, and the four access maps which would match that access pattern.

Another type of pattern that may be used is an irregular pattern. The last two patterns illustrated in FIG. 3 are examples of irregular patterns. Generally, an irregular pattern may be any access pattern which is predictable, but is not accurately described with a stride. That is, the actual cache blocks accessed by the instruction code being executed are irregularly spaced, but are still predictable. Access maps with irregular patterns may be detectable in the pattern memory 44, and may be accurately predicted for prefetches. Wildcard patterns may also be used to aid in detecting irregular patterns as well, as mentioned above.

An example in which prefetch symbols for multiple cache levels is shown as well, including Ps for the cache blocks nearest the access point and Ls in subsequent cache blocks. As mentioned previously, there may be more levels of cache to which prefetching is supported, and there may be patterns with prefetch symbols for those additional levels as well.

In some embodiments, one or more default patterns may be supported (referred to as "density patterns"). Density patterns may include one A symbol at the access point, and prefetch symbols. Since the access point is automatically an A, the density patterns match if no other pattern matches. The density patterns may presume the nearby cache blocks are good prefetch candidates, and thus may include prefetch symbols nearby. To avoid potentially polluting the nearest caches to the processor 10, density patterns may include prefetch symbols for the lowest level cache to which prefetch is supported, in an embodiment. For example, the density pattern shown in FIG. 3 includes L prefetch symbols to prefetch to the external cache 34. Backward density patterns may be supported as well in some embodiments.

In embodiments in which in-progress prefetch symbols are included in the access maps, the in-progress symbols may match corresponding prefetch symbols in the access patterns, so that those prefetches are not generated again.

Figure 5:
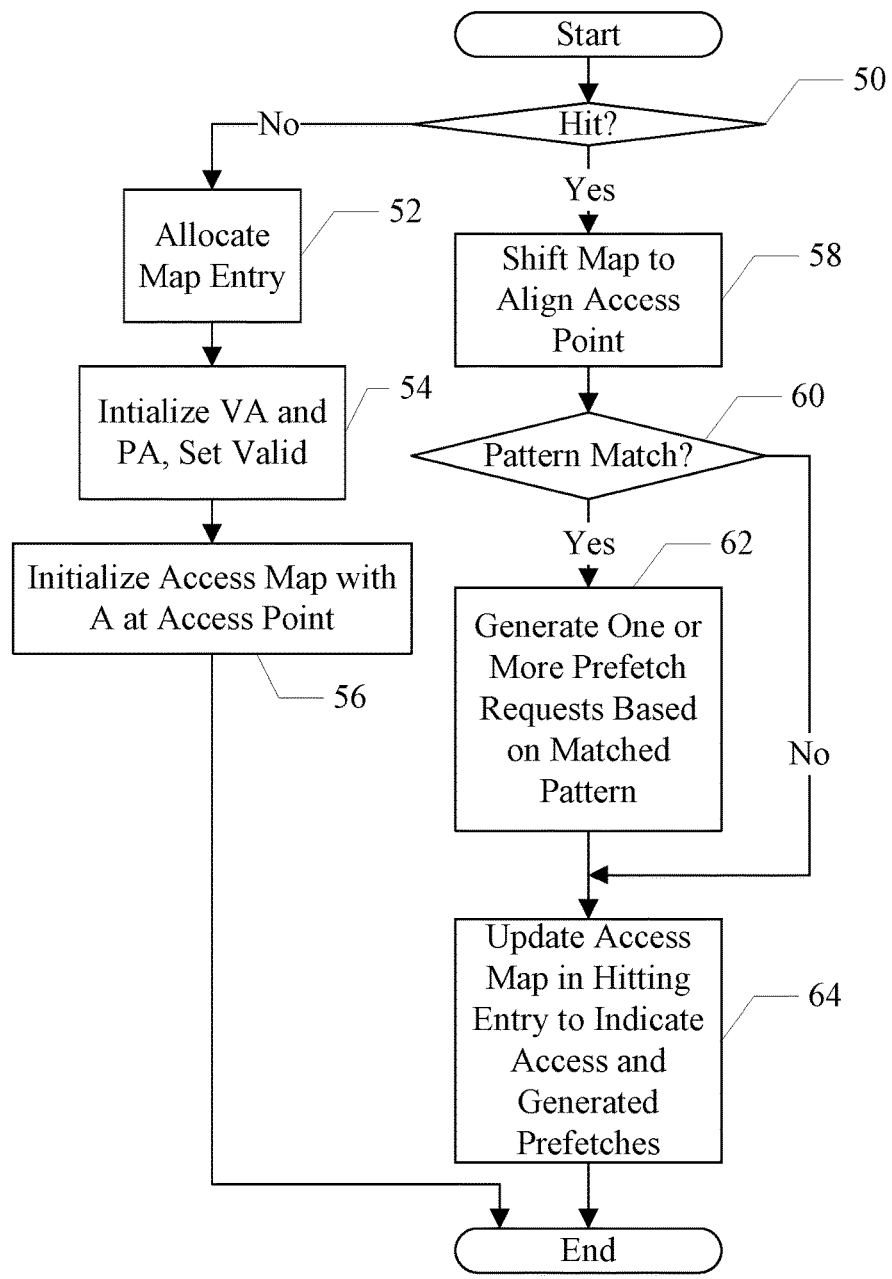
FIG. 5 is a flowchart illustrating operation of one embodiment of the prefetch circuit shown in FIG. 2.

Turning next to FIG. 5, a flowchart is shown illustrating operation of one embodiment of the prefetch circuit 20, and more particularly the control circuit 46, in response to a virtual address received by the prefetch circuit 20 (in parallel with the address accessing the data cache 30). While the blocks are shown in a particular order for ease of understanding, other orders may be used. Blocks may be performed in parallel in combinatorial logic in the prefetch circuit 20/control circuit 46. Blocks, combinations of blocks, and/or the flowchart as a whole may be pipelined over multiple clock cycles. The prefetch circuit 20/control circuit 46 may be configured to implement the operation shown in FIG. 5.

The virtual address (or the access map tag portion of the address) may be presented to the access map memory 40. If the virtual address is a miss in the access map memory 40 (decision block 50, "no" leg), the control circuit 46 may be configured to allocate an entry in the access map memory 40 for the access region containing the virtual address (block 52). Any sort of allocation scheme may be used. For example, the control circuit 46 may maintain least recently used (LRU) data over the access map entries, and may replace the LRU entry if there are no invalid entries to be allocated. Various pseudo-LRU schemes may be used, or a random replacement may be used. The control circuit 46 may initialize the tag portion of the allocated entry (in the tag CAM 40A) with the virtual address of the access region (e.g. bits M:P+1 of the VA) and the physical address (PA) provided by a translation lookaside buffer (TLB) associated with the data cache, and may set the valid bit (block 54). The PA may be provided in a later clock cycle than the VA, in some embodiments. Additionally, the control circuit may initialize the access map portion of the entry (in the map RAM 40B) with a clear access map (e.g. all invalid) except for an A at the access point indicated by the access map offset (bits P:N of the VA) (block 56). The state field associated with the access map may also be initialized, if included.

If the virtual address is a hit in the access map memory 40 (decision block 50, "yes" leg), the access map memory 40 may output the corresponding access map to the shifter 42. The shifter 42 may shift the access map to align the access point (the offset to the accessed cache block in the access region—block 58). The shifted pattern output by the shifter 42 may be compared to the access patterns in the access pattern memory 44. If there is a match on a pattern (decision block 60, "yes" leg), the control circuit 42 may be configured to generate one or more prefetch requests based on the Ps and/or Ls in the matched pattern and further based on any previously generated prefetches recorded in the access map (block 62). That is, a previously generated or issued prefetch may not be generated again.

The control circuit 46 may also update the access map in the hitting entry of the access map memory 40, independent of whether the access map matches a pattern in the access pattern memory 44 (block 64). In the present embodiment, the control circuit 42 may update the access map to indicate the current access as well as any generated prefetch requests. If the access map has an invalid symbol (".") at the access point and the access is a demand access, the "A" symbol may be inserted at the access point. If the access map has a prefetch symbol ("P") at the access point and the access is a demand access that hits in the data cache 30, the "S" symbol may be inserted at the access point. If the access map has an invalid symbol (".") at the access point and the access is a prefetch request, the "P" symbol may be inserted at the access point (or the "L" symbol, for prefetch requests to the external cache 34). The generated prefetches may be indicated at their respective points in the access map.

Figures 6, 7:
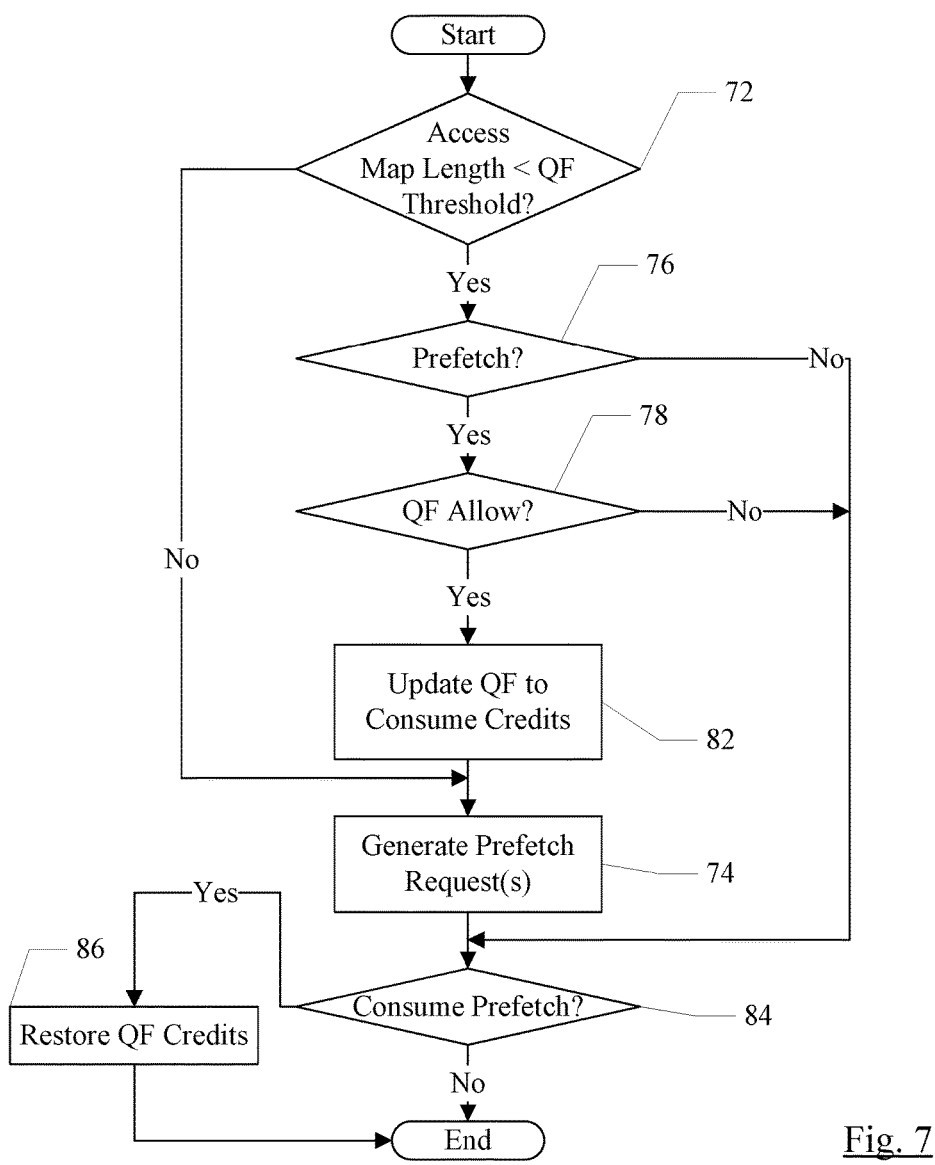
FIG. 6 is a block diagram illustrating one embodiment of an access map entry.
FIG. 7 is a flowchart illustrating operation of one embodiment of the prefetch circuit shown in FIG. 2 for using a quality factor for each cache to which prefetches may be generated.

In some embodiments, the state field in each access map entry may store one or more quality factors. Such an entry 70 is illustrated in FIG. 6, which shows the virtual address tag (VA), the physical address (PA), the access map (AM), a pair of quality factors, and a granularity indication (Gran). Other embodiments may not include the granularity indication. A quality factor may be a value that measures or estimates the effectiveness of the prefetching for the corresponding access map. The quality factor may be used to further limit or prevent prefetching (above what the pattern itself already limits) when the effectiveness is not high. Additionally, in some embodiments, the quality factor may be used to "meter" prefetching that is effective but that is being consumed slowly. That is, using the quality factor to limit the prefetching may result in prefetched data being delivered closer to the time at which the data will be consumed by demand fetches. The scheduling of memory accesses in the memory system may be more efficient in some cases, since the prefetch traffic may be less bursty and thus the congestion in the memory system may be lower.

A pair of quality factors may be used to control prefetch request generation for the data cache 30 and the external cache 34 somewhat independently. The accuracy quality factor (AQF) may control the prefetch generation for the data cache 30 and the bandwidth quality factor (BQF) may control the prefetch generation for the external cache 34. Other embodiments which employ prefetching at more than two levels may employ a quality factor for each level.

As mentioned above, longer access patterns may tend to be more accurate in predicting prefetches, and so the quality factor may not be used if the access map length exceeds a threshold. The threshold may be fixed or programmable in the prefetch circuit, in some embodiments. Different threshold levels may be used for different cache levels (e.g. higher thresholds for lower levels).

In an embodiment, the quality factor may be a token-based or credit-based mechanism. The tokens/credits may represent an allowable amount of outstanding prefetching. Accordingly, tokens/credits may be consumed when a prefetch request is generated (and a prefetch request may only be generated if sufficient tokens/credits are available). A successful prefetch may return tokens/credits to the quality factor value. In an embodiment, a successful prefetch may return more tokens/credits than the generation of a prefetch request consumes, and the passage of time may not return tokens/credits. Alternatively, a more equal return of credits to credits consumed may be used, and the passage of time may also return tokens/credits to the quality factor.

FIG. 7 is a flowchart illustrating operation of one embodiment of the prefetch circuit 20, and more particularly the control circuit 46, in response to a pattern match in the access pattern memory 44 for an access map when quality factors are used. Other operation, e.g. as illustrated in FIG. 5 and discussed above, may also be performed. While the blocks are shown in a particular order for ease of understanding, other orders may be used. Blocks may be performed in parallel in combinatorial logic in the prefetch circuit 20/control circuit 46. Blocks, combinations of blocks, and/or the flowchart as a whole may be pipelined over multiple clock cycles. The prefetch circuit 20/control circuit 46 may be configured to implement the operation shown in FIG. 7.

The description of FIG. 7 below refers to a quality factor. The same set of operations may be performed for each quality factor for which the corresponding access pattern has at least one prefetch request to be generated. Thus, the operation may be performed with the AQF to generate prefetch requests if Ps are in the access map, and the operation may be performed with the BQF to generate prefetch requests if Ls are in the access map. In one embodiment, both AQF and BQF credits may be required to generate external cache prefetch requests (Ls).

If the access map length is greater than the quality factor threshold (decision block 72, "no" leg), the quality factor is not used for the access map. The prefetch request(s) may be generated as indicated in the access map (block 74). If the access map length is less than the quality factor threshold, but the indicated prefetch requests have already been generated or there are not enough credits/tokens available to generate a prefetch request (decision block 72, "yes" leg and either decision block 76, "no" leg or decision block 78, "no" leg), there is no prefetch request to be generated. If there are prefetch request(s) to be generated and there are sufficient tokens/credits (decision blocks 72, 76, and 78, "yes" legs), the control circuit 46 may be configured to update the quality factor to consume the credits/tokens for a prefetch request or requests (block 82) and may be configured to generate the indicated and permitted prefetch request(s) (block 74). As mentioned previously, L prefetches may consume both AQF and BQF credits. In such embodiments, the prefetch circuit 20/control circuit 46 may check for sufficient AQF and BQF credits for an L prefetch, and may consume both when the L prefetch is generated.

The number of credits/tokens consumed for a prefetch request and restored for a successful prefetch may vary in various embodiments. In one example, the AQF may be initialized with a defined number of credits/tokens. A maximum number of tokens may be supported for each quality factor, and the initialization of the AQF may be any amount within the range of 0 and the maximum. For example, about 75% of the maximum may be the initial amount of the AQF. Other actions and their effects on the AQF and BQF are shown in the table of FIG. 8, for an embodiment. In the table, a plus sign indicates that the actions increase the corresponding quality factor; a minus sign indicates that the actions decrease the corresponding quality factor; and a zero indicates no change to the corresponding quality factor. In the case of a decrease, if the number of credits/tokens involved in the decrease are not available (e.g. the decrease would reduce the quality factor below zero), then the action may not be taken. In the case of an increase, the number of credits/tokens may be capped at the maximum. The amount of each increase or decrease may vary, or may be the same, in various embodiments.

In the table, a load prefetch is a prefetch request for an expected load operation. Thus, any coherence state which allows the cache block to be read may be used as the memory system's response to the prefetch request. A store prefetch request is a prefetch request for an expected store operation. Thus, the store prefetch request may require a coherence state permitting update of the cache block in the memory system's response to the prefetch request. Data cache prefetches are prefetch requests to the data cache 30 (generated from Ps in the access map). External cache prefetches are prefetch requests to the external cache 34 (generated from Ls in the access map). In general, any set of events may be used to update quality factors corresponding to various levels of cache in a memory hierarchy, in various embodiments.

In an embodiment, the following generalized relationships may be used for the increases and decreases of the AQF and BQF, although other embodiments may use any relationship among the amounts. A data cache load prefetch may be used as the base amount on which the other increases/decreases are specified for this example. The AQF updates will be discussed first in this paragraph, followed by the BQF updates in the next paragraph. The data cache load prefetch may be about 4-6% of the maximum number of credits/tokens. Store data cache prefetch requests may be about 1.25× to 1.5× the number of tokens/credits consumed for a data cache load prefetch (the "load credits/tokens," for brevity). Consumption of the data cache prefetch by a demand fetch (e.g. the demand fetch hits the prefetched data in the data cache) may be an increase of about 2× the load credits/tokens. Consumption of the data cache prefetch by a demand while the prefetch is still pending may be about 1.5× the load credits/tokens. If a prefetch request hits in the data cache, the prefetch request was not useful and thus may decrease credits/tokens (e.g. about 1.5× the load credits/tokens). Generation of external cache load prefetch requests may be a decrease of about 0.75× to 1.0× the load credits/tokens. External cache store prefetch requests may by about 1.0× to 1.25× the load credits/tokens. Consumption of the external cache prefetch by a demand fetch may be an increase of about 2.5× of the load credits/tokens, whereas consumption of the external cache prefetch by a data cache prefetch may be an increase of about 1.25× to 1.5× the load credits/tokens. Similarly, consumption of the external prefetch, while it is still pending, by an demand fetch may be an increase of about 1.25× to 1.5× the load credits/tokens.

The BQF may be initialized (e.g. to about 64-66% of the maximum credits/tokens) in response to an initial miss in the external cache for a given access pattern. Subsequent misses for the same access pattern may be an increase of about 2.5× the load credits/tokens. The BQF may be decreased in response to the generation of external cache prefetch requests (e.g. generation of external cache load prefetch requests may decrease BQF by about 0.75× to 1.0× the load credits/tokens. External cache store prefetch requests may by about 1.0× to 1.25× the load credits/tokens.

As mentioned previously, the above discussion is merely one example of the updates that may be made to the AQF and BQF and the events/actions which may cause updates. Other embodiments may vary the events/actions and/or the amount of credit/token update for the events/actions (and the relative amounts of update with respect to each other, as in the above example).

The number of credits/tokens consumed for a prefetch request and restored for a successful prefetch may vary in various embodiments. In one example, the AQF may be initialized to 75 credits/tokens and 100 may be the maximum in each quality factor. Other actions and their affects on the AQF and BQF are shown in the table of FIG. 8. In the table, a load prefetch is a prefetch request for an expected load operation. Thus, any coherence state which allows the cache block to be read may be used as the memory system's response to the prefetch request. A store prefetch request is a prefetch request for an expected store operation. Thus, the store prefetch request may require a coherence state permitting update of the cache block in the memory system's response to the prefetch request. Data cache prefetches are prefetch requests to the data cache 30 (generated from Ps in the access map). External cache prefetches are prefetch requests to the external cache 34 (generated from Ls in the access map). In general, any set of events may be used to update quality factors corresponding to various levels of cache in a memory hierarchy, in various embodiments.

As mentioned above, some embodiments may implement multiple granularities of access maps. For example, the initial granularity of an access map may be the size of a cache block (e.g. 64 bytes, in one embodiment). A larger granularity may be a multiple of the size of a cache block (e.g. twice the size, or 128 bytes, in an embodiment). More particularly, the larger granularity may be the size of a cache block in a lower level cache such as the external cache 34, when the lower level caches implement larger cache block sizes. Larger (or coarser) granularity prefetches may allow the prefetch circuit to get farther ahead of the current access point for a given number of prefetches. The larger granularity may also smooth out noisier patterns, since more demand accesses will lie in a given access point.

FIG. 9 is a flowchart illustrating one embodiment of switching granularities for a given access map in the prefetch circuit 20, and more particularly the control circuit 46. Other operation, e.g. as illustrated in FIGS. 5 and/or 7 and discussed above, may also be performed. While the blocks are shown in a particular order for ease of understanding, other orders may be used. Blocks may be performed in parallel in combinatorial logic in the prefetch circuit 20/control circuit 46. Blocks, combinations of blocks, and/or the flowchart as a whole may be pipelined over multiple clock cycles. The prefetch circuit 20/control circuit 46 may be configured to implement the operation shown in FIG. 9.

During an access map read, the prefetch circuit 20 may detect whether or not there is a potential for a granularity switch for the access map (decision block 90). In an embodiment, an access map may be eligible for a granularity switch if the length of the access map (e.g. the number of accesses in map) exceeds a certain threshold. The threshold may be programmable or fixed, in various embodiments. In one embodiment, the length may be 6, for example. Additional conditions for granularity switch eligibility may exist as well. For example, in an embodiment, the pattern in the access map is required to be a strided pattern with a stride of one (i.e. consecutive cache blocks are being fetched). Furthermore, a granularity switch may not already be pending for the access map. If these conditions are met (decision block 90, "yes" leg) the prefetch circuit 20 may be configured to establish a granularity switch pending state for the access map (block 92). The granularity switch pending state may be part of the granularity field (Gran in FIG. 6), or may be an additional state bit in the state field.

If the conditions for initiating a granularity switch are not met (decision block 90, "no" leg), but the granularity switch is pending from a previous access (decision block 94, "yes" leg), the prefetch circuit 20 may clear the access map (since it is currently recording accesses at the finer (or smaller) granularity) (block 96). The prefetch circuit 20 may reallocate the same access map location in the access map memory 40 with the granularity field indicating large (coarse) granularity (block 98). Additionally, since the access map now covers a region that is twice as large, it is possible that there is an overlapping access map (duplicate map). Such maps are invalidated (block 100)

System

Figure 10:
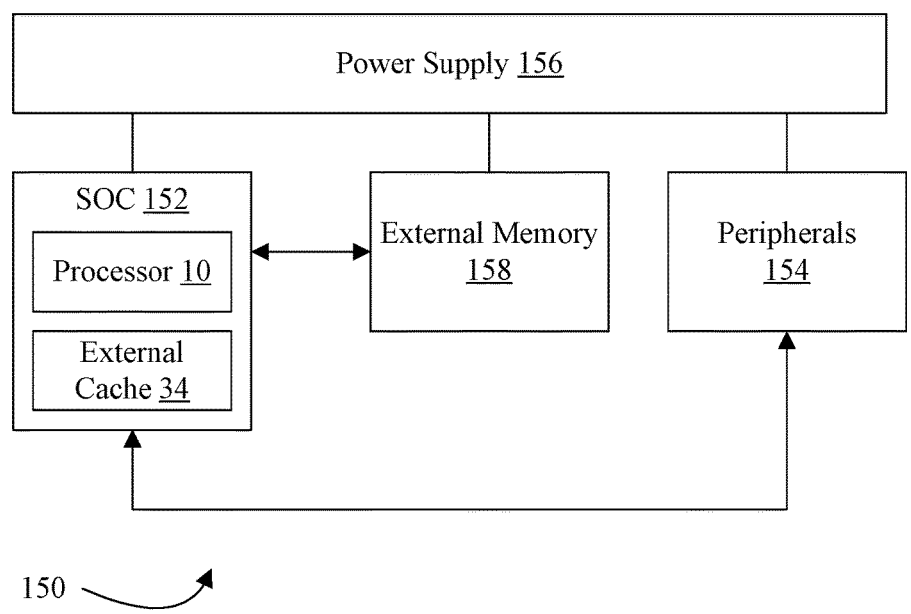
FIG. 10 is a block diagram illustrating one embodiment of a system.

Turning next to FIG. 10, a block diagram of one embodiment of a system 150 is shown. In the illustrated embodiment, the system 150 includes at least one instance of an system on a chip (SOC) 152 coupled to one or more peripherals 154 and an external memory 158. A power supply 156 is provided which supplies the supply voltages to the SOC 152 as well as one or more supply voltages to the memory 158 and/or the peripherals 154. In some embodiments, more than one instance of the SOC 152 may be included (and more than one memory 158 may be included as well). The SOC 152 may include one or more instances of the processor 10 and external cache 34 as illustrated in FIG. 1.

The peripherals 154 may include any desired circuitry, depending on the type of system 150. For example, in one embodiment, the system 150 may be a mobile device (e.g. personal digital assistant (PDA), smart phone, etc.) and the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the SOC 152 in a chip-on-chip or package-on-package implementation.

Numerous variations and modifications will become apparent to those skilled in the art once the above disclosure is fully appreciated. It is intended that the following claims be interpreted to embrace all such variations and modifications.

What is claimed is:

1. A system comprising:
   a processor including:
      a data cache;
      a prefetch circuit coupled to the data cache; and
      an external interface unit configured to communicate between the processor and other components of the system;
   a second cache coupled to the processor, wherein the second cache is logically between the data cache and a memory system;
   wherein the prefetch circuit is configured to:
   track a plurality of access maps, each access map of the plurality of access maps recording accesses to a plurality of cache blocks within a defined region associated with a corresponding address of a plurality of addresses;
   responsive to a first address input to the data cache, identifying a first access map of the plurality of access maps, wherein the first address is within the defined region of the first access map;
   compare the first access map to a plurality of access patterns; and
   responsive to a match on a first access pattern of the plurality of access patterns that includes a first prefetch symbol identifying a first cache block of the plurality of cache blocks to be prefetched into the data cache and a second prefetch symbol identifying a second cache block of the plurality of cache blocks to be prefetched into the second cache, generating respective prefetch requests for the data cache and the second cache; and
   the external interface unit comprises a queue configured to store the respective prefetch request for the second cache from the prefetch circuit to be communicated to the second cache, wherein the prefetch circuit is configured to transmit the respective prefetch request for the second cache to the queue, bypassing the data cache.

2. The system as recited in claim 1 wherein the second cache includes a request queue for requests to access the second cache, and wherein the processor is configured to transmit the respective prefetch request for the second cache to the request queue.

3. The system as recited in claim 1 wherein the prefetch circuit is configured to track a first quality factor indicating an accuracy of prefetching into the data cache for the first access map and a second quality factor indicating an accuracy of prefetching into the second cache for the first access map, and wherein the prefetch circuit is configured to control a number of prefetches generated from the first access map for the data cache responsive to the first quality factor and to control a number of prefetches generated from the first access map to the second cache responsive to the second quality factor.

4. The system as recited in claim 1 wherein a pattern length of the first access pattern is based on a number of demand accesses that have been matched, and wherein the control circuit is configured to change a granularity of the first access map responsive to the pattern length exceeding a threshold amount.

5. The system as recited in claim 4 wherein the granularity is initially a size of one cache block in the data cache, and wherein the granularity is changed to a multiple of the size of the cache block.

6. The system as recited in claim 4 wherein the prefetch circuit is configured to clear the first access map and reallocate the first access map at the changed granularity responsive to the change.

7. The system as recited in claim 1 wherein a second access pattern of the plurality of access patterns is a default match, and wherein the second access pattern includes one or more prefetch symbols identifying cache blocks to be prefetched into the second cache and excludes prefetch symbols identifying cache blocks to be prefetched into the data cache.

8. A method comprising:
tracking a plurality of access maps in a prefetch circuit, each access map of the plurality of access maps recording accesses to a plurality of cache blocks within a defined region associated with a corresponding address of a plurality of addresses;
responsive to a first address input to a data cache, identifying a first access map of the plurality of access maps in the prefetch circuit, wherein the first address is within the defined region of the first access map;
comparing the first access map to a plurality of access patterns in the prefetch circuit;
responsive to a match on a first access pattern of the plurality of access patterns that includes a first prefetch symbol identifying a first cache block of the plurality of cache blocks to be prefetched into the data cache and a second prefetch symbol identifying a second cache block of the plurality of cache blocks to be prefetched into a second cache that is logically between the data cache and memory, generating a first prefetch request for the data cache and a second prefetch request for the second cache;
tracking a first quality factor indicating an accuracy of prefetching into the data cache for the first access map and a second quality factor indicating an accuracy of prefetching into the second cache for the first access map in the prefetch circuit;
controlling a number of prefetches generated from the first access map for the data cache responsive to the first quality factor in the prefetch circuit; and
controlling a number of prefetches generated from the first access map to the second cache responsive to the second quality factor in the prefetch circuit.

9. The method as recited in claim 8 further comprising bypassing the data cache with the second prefetch request.

10. A processor comprising:
a data cache; and
a prefetch circuit coupled to the data cache;
wherein the prefetch circuit is configured to:
track a plurality of access maps, each access map of the plurality of access maps recording accesses to a plurality of cache blocks within a defined region associated with a corresponding address of a plurality of addresses;
responsive to a first address input to the data cache, identifying a first access map of the plurality of access maps, wherein the first address is within the defined region of the first access map;
compare the first access map to a plurality of access patterns;
responsive to a match on a first access pattern of the plurality of access patterns that includes a first prefetch symbol identifying a first cache block of the plurality of cache blocks to be prefetched into the data cache and a second prefetch symbol identifying a second cache block of the plurality of cache blocks to be prefetched into a second cache, generating respective prefetch requests for the data cache and the second cache, wherein the second cache is coupled to the processor during use and the second cache is logically between the data cache and a memory system;
track a first quality factor indicating an accuracy of prefetching into the data cache for the first access map and a second quality factor indicating an accuracy of prefetching into the second cache for the first access map;
control a number of prefetches generated from the first access map for the data cache responsive to the first quality factor; and
control a number of prefetches generated from the first access map to the second cache responsive to the second quality factor.

11. The processor as recited in claim 10 further comprising an external interface unit configured to communicate between the processor and at least the second cache, and wherein the external interface unit comprises a queue configured to store the respective prefetch request for the second cache from the prefetch circuit to be communicated to the second cache, wherein the prefetch circuit is configured to transmit the respective prefetch request for the second cache to the queue, bypassing the data cache.

12. The processor as recited in claim 11 wherein the processor is configured to transmit the respective prefetch request for the second cache to a request queue in the second cache.

13. The processor as recited in claim 10 wherein a pattern length of the first access pattern is based on a number of demand accesses that have been matched, and wherein the control circuit is configured to change a granularity of the first access map responsive to the pattern length exceeding a threshold amount.

14. The processor as recited in claim 13 wherein the granularity is initially a size of one cache block in the data cache, and wherein the granularity is changed to a multiple of the size of the cache block.

15. The processor as recited in claim 13 wherein the prefetch circuit is configured to clear the first access map and reallocate the first access map at the changed granularity responsive to the change.

16. The processor as recited in claim 10 wherein a second access pattern of the plurality of access patterns is a default match, and wherein the second access pattern includes one or more prefetch symbols identifying cache blocks to be prefetched into the second cache and excludes prefetch symbols identifying cache blocks to be prefetched into the data cache.

\* \* \* \* \*